US010986086B2

United States Patent
Abdi Taghi Abad et al.

(10) Patent No.: US 10,986,086 B2
(45) Date of Patent: *Apr. 20, 2021

(54) PASSWORD PROTECTION IN A COMPUTING ENVIRONMENT

(71) Applicant: Capital One Services, LLC, McLean, VA (US)

(72) Inventors: Fardin Abdi Taghi Abad, Champaign, IL (US); Reza Farivar, Champaign, IL (US); Jeremy Edward Goodsitt, Champaign, IL (US); Anh Truong, Champaign, IL (US); Kenneth Taylor, Champaign, IL (US); Mark Louis Watson, Urbana, IL (US); Kate Key, Effingham, IL (US); Vincent Pham, Champaign, IL (US); Austin Grant Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 15 days.

This patent is subject to a terminal disclaimer.

(21) Appl. No.: 16/554,726

(22) Filed: Aug. 29, 2019

(65) Prior Publication Data

US 2020/0382487 A1 Dec. 3, 2020

Related U.S. Application Data

(63) Continuation of application No. 16/424,713, filed on May 29, 2019, now Pat. No. 10,440,011.

(51) Int. Cl.
*H04L 29/06* (2006.01)

(52) U.S. Cl.
CPC ........ *H04L 63/083* (2013.01); *H04L 63/0876* (2013.01)

(58) Field of Classification Search
CPC .... H04L 63/083; H04L 63/0876; G06F 21/82
See application file for complete search history.

(56) References Cited

U.S. PATENT DOCUMENTS

| | | | |
|---|---|---|---|
| 9,390,256 B2 * | 7/2016 | Jakobsson | H04L 63/083 |
| 9,590,978 B2 * | 3/2017 | Joyce, III | H04L 9/3247 |
| 9,836,595 B1 * | 12/2017 | Goldberg | G06F 3/0484 |
| 10,728,261 B2 * | 7/2020 | Paine | G06F 21/554 |
| 10,783,230 B2 * | 9/2020 | Cramer | G06F 21/46 |

(Continued)

*Primary Examiner* — Lynn D Feild
*Assistant Examiner* — Viral S Lakhia
(74) *Attorney, Agent, or Firm* — Kacvinsky Daisak Bluni PLLC

(57) ABSTRACT

Techniques for protecting passwords and/or password entry by a user are provided. User identification data for a user can be received from a remote computing device. An identity of the user can be determined based on the user identification data. A password for the user can be determined. A modified keyboard configuration associated with the user can be determined. A request can be transmitted to the remote computing device for the password for the user based on the modified keyboard configuration. A modified password from the remote computing device can be received. A converted password based on the modified password and the modified keyboard configuration can be determined. The converted password can be compared to the password for the user. The user can be authorized when the converted password matches the password for the user.

20 Claims, 7 Drawing Sheets

(56) References Cited

U.S. PATENT DOCUMENTS

| | | | |
|---|---|---|---|
| 2014/0123274 A1* | 5/2014 | Chen | G06F 3/023 |
| | | | 726/18 |
| 2014/0281480 A1* | 9/2014 | Petty | H04L 63/166 |
| | | | 713/151 |
| 2016/0117494 A1* | 4/2016 | Kaplan | G06F 21/31 |
| | | | 726/18 |
| 2017/0003871 A1* | 1/2017 | Broomhall | G06F 3/04886 |
| 2017/0185806 A1* | 6/2017 | Kong | G06F 21/45 |
| 2018/0152838 A1* | 5/2018 | Adams | G06F 21/31 |
| 2018/0285547 A1* | 10/2018 | Tsou | G06F 21/36 |
| 2019/0147158 A1* | 5/2019 | Ohkado | H04L 63/083 |
| | | | 726/19 |
| 2019/0347398 A1* | 11/2019 | Cramer | G06T 19/20 |
| 2020/0092256 A1* | 3/2020 | Hansen | H04L 63/083 |
| 2020/0134168 A1* | 4/2020 | Hwang | H04L 63/083 |

* cited by examiner

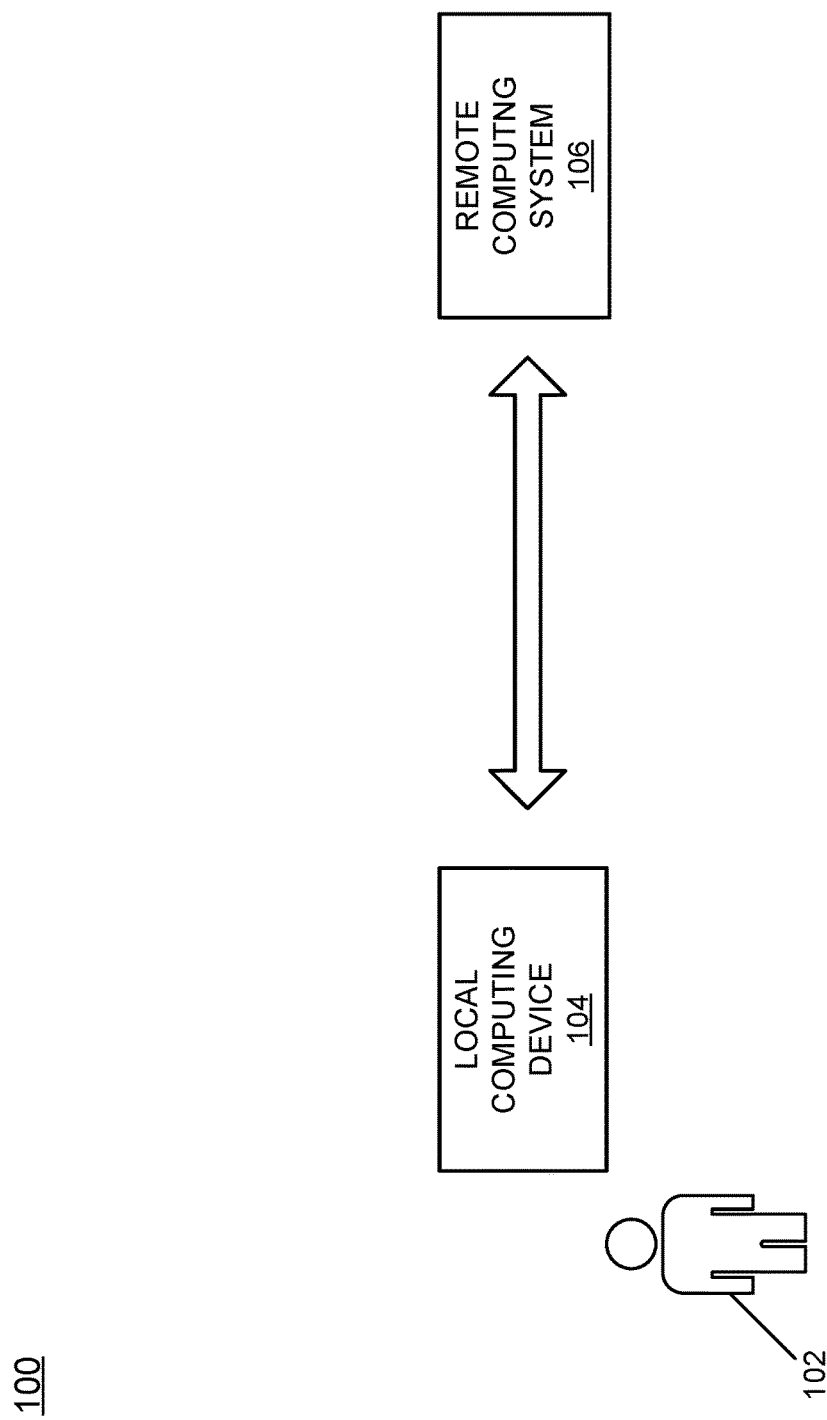

210
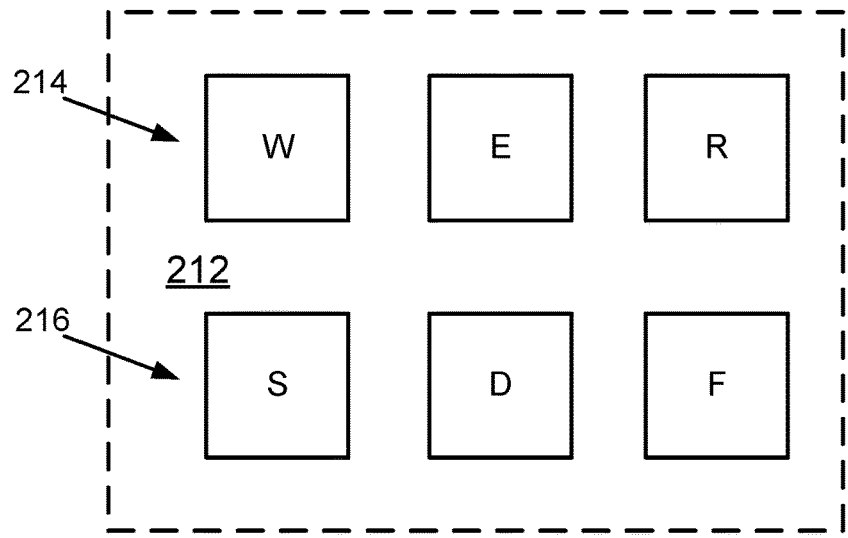
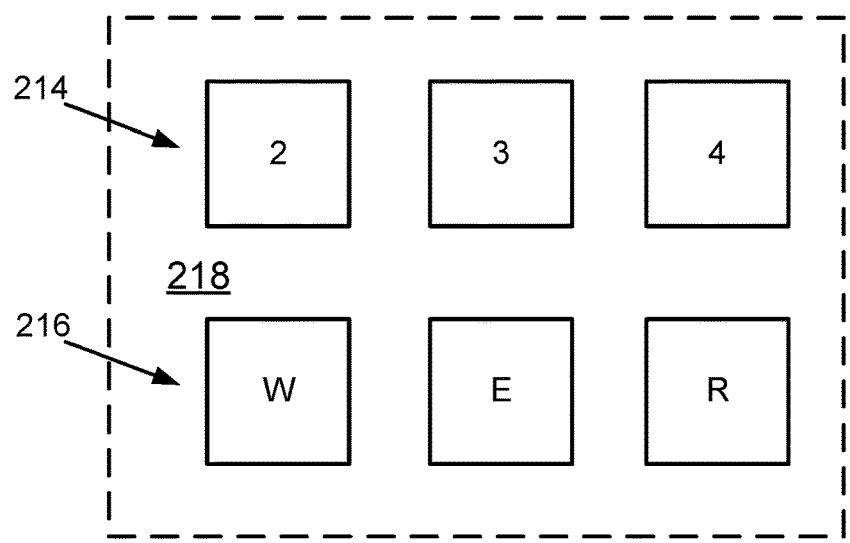
FIG. 2B

Storage Medium 400

Computer Executable Instructions for 300

PASSWORD PROTECTION IN A COMPUTING ENVIRONMENT

RELATED APPLICATIONS

This application is a continuation of U.S. patent application Ser. No. 16/424,713, entitled "PASSWORD PROTECTION IN A COMPUTING ENVIRONMENT" filed on May 29, 2019. The contents of the aforementioned application are incorporated herein by reference.

TECHNICAL FIELD

Embodiments described herein generally relate to computer security.

BACKGROUND

Conventional techniques for authenticating a user typically involve a user entering a password through a computing device. Entering a password through a user interface of a computing device is often not secure and may allow other individuals to simply see the password the user enters (e.g., through a keyboard) or to record the password entry (e.g., through key logging). Given the vulnerabilities related to entering a password, what is needed are mechanisms for more secure entry of a password to protect a user's account and authentication of the user. In this manner, protection against malicious key loggers and/or activity recorders that may reside on the user's computing device can be prevented from obtaining the password of the user.

SUMMARY

This disclosure presents various systems, components, and methods related to providing password protection. Each of the systems, components, and methods disclosed herein provides one or more advantages over conventional systems, components, and methods.

Various embodiments provide techniques for protecting passwords and/or password entry by a user. User identification data for a user can be received from a remote computing device. An identity of the user can be determined based on the user identification data. A password for the user can be determined. A modified keyboard configuration associated with the user can be determined. A request can be transmitted to the remote computing device for the password for the user based on the modified keyboard configuration. A modified password from the remote computing device can be received. A converted password based on the modified password and the modified keyboard configuration can be determined. The converted password can be compared to the password for the user. The user can be authorized when the converted password matches the password for the user.

The password protection techniques described herein provide protection against malicious attacks against a user that attempt to steal a password of the user—either through simply directly observing the user enter the password or through a key logger or activity recorder resident on a computing device of the user. The password protection techniques described herein block correct capture of the user's password, thereby enhancing security and providing peace of mind to the user. Other embodiments are also disclosed and described.

BRIEF DESCRIPTION OF THE DRAWINGS

FIG. 1 illustrates an operating environment.

FIG. 2B illustrates a second modified keyboard configuration.

FIG. 4 illustrates a storage medium.

DETAILED DESCRIPTION

Figure 2A:
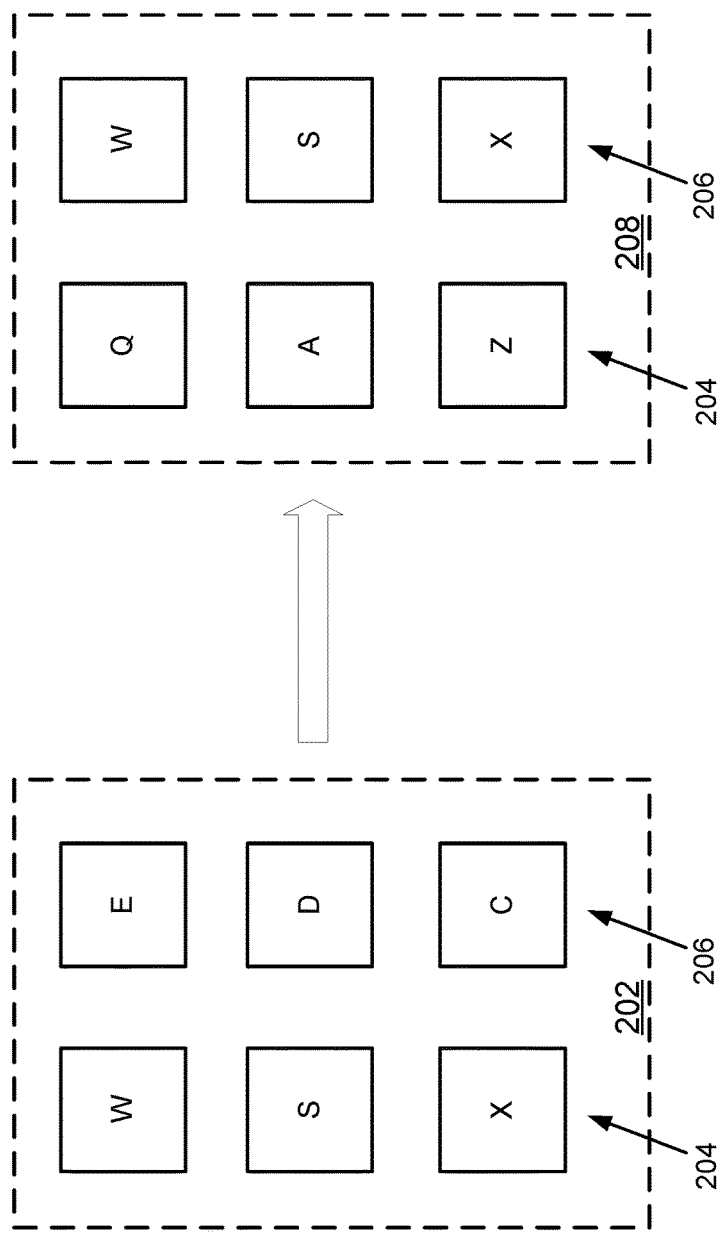
FIG. 2A illustrates a first modified keyboard configuration.

FIG. 1 illustrates an operating environment 100 such as may be representative of various embodiments in which techniques for password protection are provided. The operating environment 100 can include a user 102, a local computing device 104, and a remote computing system 106.

The local computing device 104 can be any type of electronic computing device such as, for example, a desktop, a laptop, a tablet, a notebook, or a mobile device. The local computing device 104 can be operated by the user 102.

The remote computing system 106 can be any type of computing device including a server or can represent a computer network, a cloud-based computing system, a database, or any other computer networking component, electronic computing device, and/or storage device.

The local computing device 104 and the remote computing system 106 can be communicatively coupled such that any type of data or information can be shared between the local computing device 104 and the remote computing system 106 over any type of communications network. Each of the local computing device 104 and the remote computing system 106 may be communicatively coupled to any number of other local and/or remote devices, systems, or networks.

In various embodiments, the remote computing system 106 can provide a website or other web-based service accessible to the local computing device 104. In various embodiments, the website provided by the remote computing system 106 can be restricted to only authorized users. For example, the user 102 can be required to enter a user identification (ID) (e.g., user identification data) and an associated password to gain access to information, content, and/or services provided by the website of the remote computing system 106. The user identification and password for the user 102 can be part of a user account for the user 102. Techniques described herein provide password protection mechanisms that improve security of the password associated for the user 102.

In various embodiments, when the user 102 creates the user's account on the remote computing system 106, the user 102 can generate a user ID (e.g., that uniquely identifies the user 102) and a corresponding password. Further, as part of creating an account, the user can generate one or more modified keyboard configurations for entering the password on the local computing device 104. In various embodiments, generation of the one or more modified keyboard configurations can be conducted when the local computing device 104 is a secure device and/or operates over a secure network. In various embodiments, when the local computing device 104 is not a secure device and/or does not operate over a secure network, then the remote computing system 106 can require the user to develop the modified keyboard configurations at a later time (e.g., the next time the user 102 logs on to the remote computing system 106 through a secure computing device and/or secure network).

In various embodiments, a non-modified or standard keyboard configuration can be a QWERTY keyboard configuration. In various embodiments, a modified keyboard configuration can be any keyboard configuration that varies from the standard keyboard configuration. The modified keyboard configuration can be a reassignment of keys of the standard keyboard configuration. In various embodiments, the reassignment of keys can be a one-for-one reassignment of all keys on the standard keyboard configuration. In various embodiments, the reassignment of keys can be a one-for-one reassignment of a subset of all keys on the standard keyboard configuration—for example, only alphabet keys, or only numerical keys, or any combination of certain alphabet keys and certain numerical keys.

In various embodiments, the modified keyboard configurations can be virtual configurations. That is, the modified keyboard configurations are not physical reconfigurations of any keyboard that is part of the local computing device 104. Instead, the modified keyboard configurations can be virtual reassignment of keys of a keyboard. As an example, the characters or keys of a standard keyboard can be shifted to the right by one key for a first modified keyboard configuration. As a result, for example, the keys E-D-C can be shifted to the right to where the keys R-F-V are positioned. Accordingly, to enter "E," the user would hit the R key on the standard keyboard configuration. The remote computing system 106 would receive an indication that the R key was hit by the user 102. The remote computing system 106 would then convert the received R character back to the E character based on the known modified keyboard configuration.

As another example, the characters or keys of a standard keyboard can be shifted down by one key for a second modified keyboard configuration. As a result, for example, the keys W-E-R can be shifted down to where the keys S-D-F are positioned. Accordingly, to enter "E," the user would hit the D key on the standard keyboard configuration. Again, the remote computing system 106 would receive an indication that the D key was hit by the user 102. However, based on the known modified arrangement of the keyboard that the user 102 is operating under, the remote computing system 106 would convert the received D character into an E character, as intended to be provided by the user 102. In this way, a modified keyboard arrangement can be used by the user 102 to enter characters that can be converted back to characters related to the standard keyboard configuration by the remote computing system 106.

In various embodiments, the user 102 can define any number of modified keyboard configurations. The user 102 can define a modified keyboard configuration based on suggested configurations provided by the remote computing system 106. In various embodiments, the user 102 can specify a name or identification for each modified keyboard configuration—for example, "first configuration," "second configuration," etc. The modified keyboard configurations can be stored by the remote computing system 106 and can be associated with the user 102 (e.g., stored as part of the account information for the user 102).

In various embodiments, when the user 102 attempts to access the remote computing system 106 (e.g., the website provided by the remote computing system 106), the remote computing system 106 can request the user 102 to provide user ID created when the account for the user was created. The remote computing system 106 can then use the provided login ID to identify the user 102. Based on identifying the user 102, the remote computing system 106 can determine the one or more modified keyboard configurations associated with the user 102.

In various embodiments, the remote computing system 106 can determine if the local computing device 104 being used by the user 102 is a secure computing device or a public computing device. In various embodiments, a secure computing device can be considered to be secure if operating over a secure computer network and/or if the local computing device 104 has an IP address that is known to the remote computing system 106 (e.g., the IP address of the local computing device 104 matches a stored IP address associated with the user 102). In various embodiments, a public computing device can be considered to be public if operating over a public computer network and/or if the local computing device 104 has an IP address that is not known to the remote computing system 106 (e.g., the IP address of the local computing device 104 does not match a stored IP address associated with the user 102).

In various embodiments, the remote computing system 106 can request a password for the user 102 after determining if the local computing device 104 is a secure computing device or a public computing device. If the local computing device 104 is a secure computing device, the remote computing system 106 can request the password based on the standard keyboard configuration. Alternatively, if the local computing device 104 is a public computing device, the remote computing system 106 can request the password based on one of the predetermined and stored modified keyboard configurations associated with the user 102.

In various embodiments, one of the modified keyboard configurations can be selected randomly. In various embodiments, after selecting a modified keyboard configuration, the remote computing system 106 can transmit a request to the local computing device 104 for the password of the user 102. The request can indicate the selected modified keyboard configuration. For example, the request can indicate that the password for the user 102 is requested and should be entered based on certain specified keyboard configuration (e.g., based on a name specified by the user 102 at the time the modified keyboard configuration was defined). In response to the request, the user 102 can enter the password taking into account the specified modified keyboard configuration. For example, based on the first modified keyboard configuration keyboard, the user 102 can enter the password by hitting each key of the password shifted to the right by one key in comparison to the standard keyboard configuration.

In various embodiments, the password entered by the user 102 based on a designated modified keyboard configuration can be considered to be a modified password. For example, if the password for the user is "EDC" on the standard keyboard configuration, then for the first modified keyboard configuration described above, the user 102 would enter "RFV" in response to the keyboard request. The entered "RFV" can be considered to be a modified password (e.g., a first modified password corresponding to the first modified keyboard configuration).

In response to receiving the modified password, the remote computing system 106 can compare the modified password to the actual password for the user 102. To do so, in various embodiments, the remote computing system 106 can convert the modified password "RFV" to a converted password "EDC" based on the first modified keyboard configuration. The remote computing system 106 can then compare the converted password to the stored password for the user 102. If the converted password matches the stored password for the user 102, then the remote computing system 106 can authorize the user 102—for example, can grant the user 102 access to the website provided by the remote computing system 106. If the converted password does not match the stored password for the user, then the remote computing system 106 can block authorization of the user—for example, can prevent the user 102 from accessing the website provided by the remote computing system 106.

In various embodiments, each modified keyboard configuration specified and/or defined by the user 102 can be used only a limited number of times (e.g., once). In various embodiments, any password information entered by the user 102 (either the actual designated password for the user 102 or a modified password) can be entered through any combination of user input devices such as for example, a keyboard or a displayed user interface (e.g., through a keyboard or portion thereof presented on a display of the local computing device 104). In various embodiments, a keyboard or portion thereof can be displayed on a display of the local computing device 104 allowing the user 102 to enter a password through, for example, a touchscreen or through mouse clicks when positioned over the displayed keys of the keyboard.

By using modified keyboard configurations, the operating environment 100 provides safe password protection. An individual looking at the user 102 entering the modified password or recording it (e.g., through key logging), will see the modified password entered (or will record the modified password). Since the unscrupulous individual is not aware of the modified keyboard configuration, the individual will not be able to use the information to login using the information of the user 102. As a result, the password of the user 102 is protected.

FIG. 2A illustrates a first keyboard modification 200. Keyboard 202 can represent a portion of a standard keyboard configuration (e.g., a QWERTY keyboard configuration). The keyboard 202 can include a first column of characters 204 and a second column of characters 206. The first column of characters 204 can include the characters "W," "S," and "X" as shown. The second column of characters 206 can include the characters "E," "D," and "C" as shown. Keyboard 208 can represent a modified keyboard. The keyboard 208 can result when the characters of the first and second columns 204 and 206 are shifted over by a column—for example, shifted to the right (with respect to the columns as oriented in FIG. 2). As a result, for keyboard 208, the column 206 now includes the characters "W," "S," and "X" as shown and the column 204 now includes the characters "Q," "A," "Z" as shown (e.g., the characters in the column to the left of the column 204 for the keyboard 202).

A user that has a password of "W," "S," and "X" would select the characters from the first column 204 when the keyboard 202 is the basis for password entry. However, when the keyboard 208 is the basis for password entry, the user having a password of "W," "S," and "X" would select the characters from the second column 206 (i.e., "E," "D," and "C") due to the shift in configuration of the keyboard 208 relative to the keyboard 202.

In general, the techniques described herein enable any shifting, movement, or change in the location of any character of a keyboard to form a modified keyboard configuration. Further, the modifications can be considered to be virtual modifications to a keyboard and not a physical change in the keys. That is, the modifications indicate how entered keys are to be interpreted by the remote computing system 106.

FIG. 2B illustrates a second keyboard modification 210. Keyboard 212 can represent a portion of a standard keyboard configuration (e.g., a QWERTY keyboard configuration). The keyboard 212 can include a first row of characters 214 and a second row of characters 216. The first row of characters 214 can include the characters "W," "E," and "R" as shown. The second row of characters 216 can include the characters "S," "D," and "F" as shown. Keyboard 218 can represent a modified keyboard. The keyboard 218 can result when the characters of the first and second rows 214 and 216 are shifted down by a row—for example, shifted downward (with respect to the rows as oriented in FIG. 2B). As a result, the row 216 now includes the characters "W," "E," and "R" as shown and the row 214 now includes the characters "2," "3," "4" as shown (e.g., the characters in the row above the row 214 for the keyboard 212).

A user that has a password of "W," "E," and "R" would select the characters from the first row 214 when the keyboard 212 is the basis for password entry. However, when the keyboard 218 is the basis for password entry, the user having a password of "W," "E," and "R" would select the characters from the second row 216 (i.e., "S," "D," and "F") due to the shift in configuration of the keyboard 218 relative to the keyboard 202. The remote computing system 106 can receive indications that the keys "S," "D," and "F" were entered by the user 102. The remote computing system 106 can then convert the received characters back to "W," "E," and "R" based on the known modification to the keyboard 212 that forms the keyboard 218. As such, a user entering "S," "D," and "F" using the keyboard 218 is converted into "W," "E," and "R" by the remote computing device 106.

Figure 3:
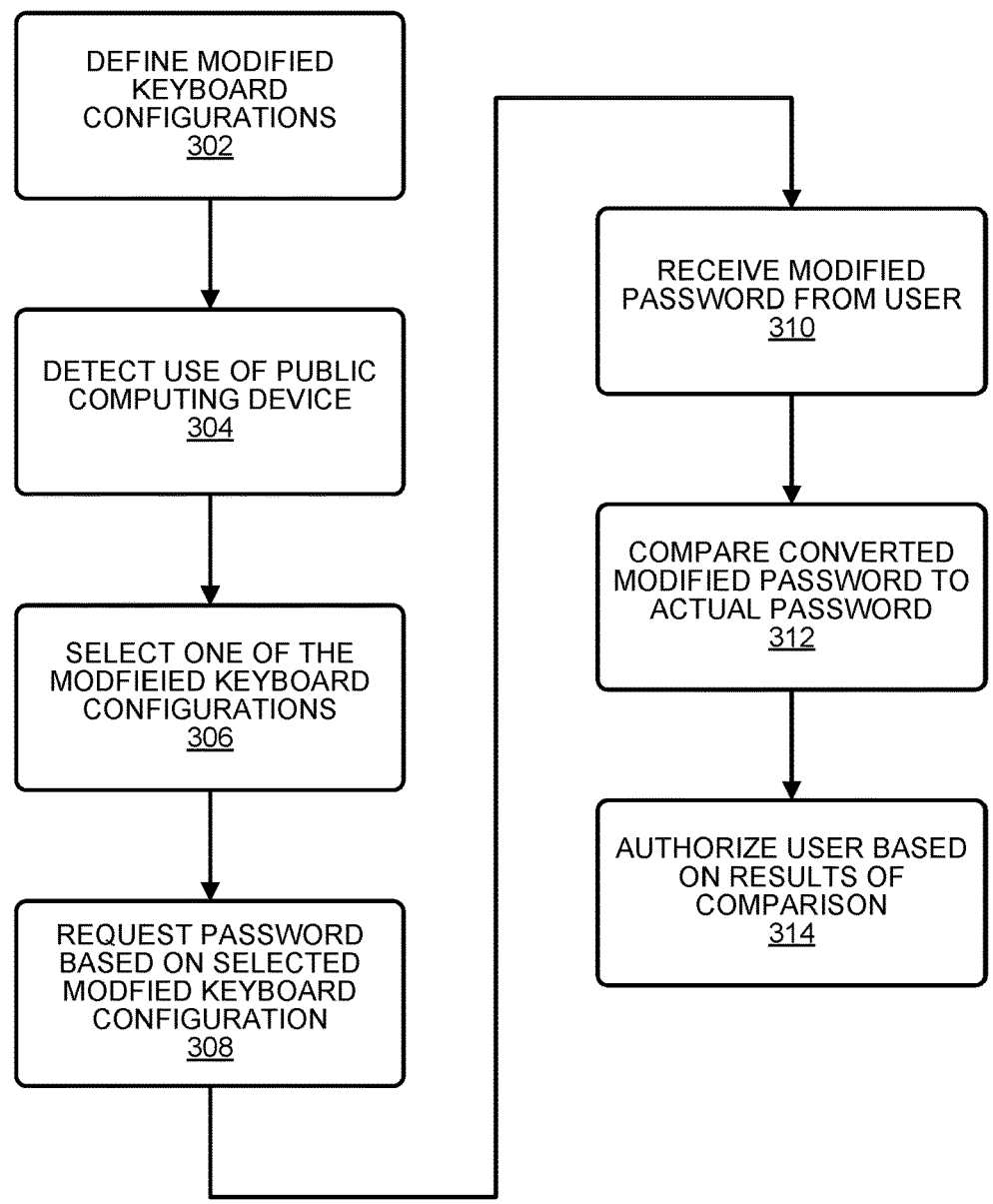
FIG. 3 illustrates a logic flow.

FIG. 3 illustrates an example of a logic flow 300 that may be representative of techniques for providing password protection. For example, the logic flow 300 may be representative of operations that may be performed in various embodiments by any constituent component of the operating environment 100 depicted in FIG. 1.

At 302, a user (e.g., the user 102) can define one or more modified keyboard configurations from a computing device (e.g., the local computing device 104). The modified keyboard configurations can be defined at a time when the user creates an account with a website (e.g., hosted or provided by the remote computing system 106). The modified keyboard configurations can be defined when the user operates a secure computing device and/or operates a computing device over a secure network. The modified keyboard configurations can be distinguished based on names or other identifications (e.g., a picture) specified by the user.

At 304, at a time subsequent to defining the modified keyboard configurations (e.g., at a later time for logging into the website using a user ID and password defined when the user creates the user account), the website can detect that the user is operating a public computer.

At 306, based on the detection that the user is interacting with the website from a non-secure computing device, the website can select one of the modified keyboard configurations defined by the user at 302. The website can identify the user based on the provided user ID. The account for the user can then be reviewed to determine a stored password for the user and the modified keyboard configurations associated with the user.

At 308, in response to the user attempting to login to the website and/or in response to the user providing a user login ID, the website can request a password from the user based on the selected modified keyboard configuration. The selected modified keyboard configuration can be indicated to the user—e.g., by name and/or by other means such as a graphic associated with the selected modified keyboard configuration. In some embodiments, the modification may be selected based on input received from a secondary device where the user has been authenticated. For example, the user may select a first modified keyboard configuration from a plurality of different modified keyboard configurations presented in a graphical user interface on the secondary device. As another example, the user may select one of the plurality of different modified keyboard configurations by providing input during a phone call to the secondary authenticated device. As yet another example, the user may select one of the plurality of different modified keyboard configurations responsive to a text message sent to the secondary authenticated device. As yet another example, the user may select one of the plurality of different modified keyboard configurations via a smartphone application that presents the plurality of different modified keyboard configurations for selection.

At 310, the website receives the modified password from the user—that is, the password for the user based on the modified keyboard configuration indicated in 308.

At 312, the web site can revert the modified password into a password corresponding to a standard keyboard configuration to generate a converted password. The converted password can then be compared to the actual password for the user established when the user defined the password using the standard keyboard configuration.

At 314, the web site can authorize the user to access the web site based on whether the converted password matched the actual password. If the converted password did not match the actual password, then the user can be blocked from accessing the website. If the converted password did match the actual password defined and stored for the user, the user can be authorized to access the website.

FIG. 4 illustrates a storage medium 400. Storage medium 400 may represent an implementation of a storage device of any computing device that may operate within the operating environment 100 of FIG. 1. The storage medium 400 can comprise any non-transitory computer-readable storage medium or machine-readable storage medium. In various embodiments, the storage medium 400 can comprise a physical article of manufacture. In various embodiments, storage medium 400 can store computer-executable instructions, such as computer-executable instructions to implement one or more of logic flows or operations described herein, such as the logic flow 300 of FIG. 3. In various embodiments, storage medium 400 can store computer-executable instructions, such as computer-executable instructions to implement any of the functionality described herein in relation to any described device, system, or apparatus. Examples of a computer-readable storage medium or machine-readable storage medium can include any tangible media capable of storing electronic data. Examples of computer-executable instructions can include any type of computer readable code.

Figure 5:
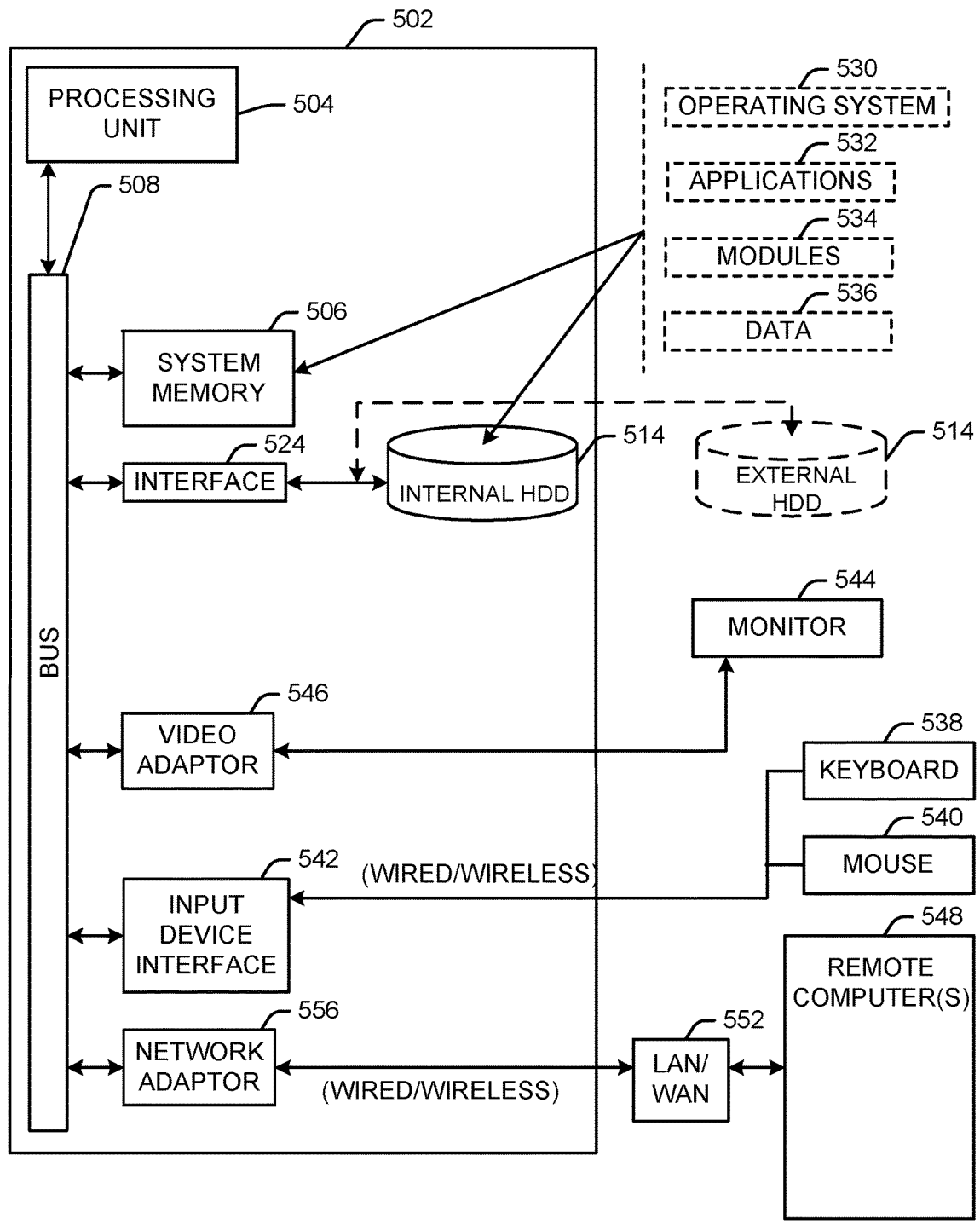
FIG. 5 illustrates a computing architecture.

FIG. 5 illustrates a computing architecture 500 that can implement various embodiments described herein. In various embodiments, the computing architecture 500 can comprise or be implemented as part of an electronic device and/or a computing device. In various embodiments, the computing architecture 500 can represent an implementation of any constituent component of the operating environment 100 depicted in FIG. 1. One or more of the constituent components of the computing architecture 500 and/or any constituent component of the operating environment 100 can be implemented in hardware, software, or any combination thereof including implementation based on a storage device (e.g., a memory unit) and logic, at least a portion of which is implemented in circuitry and coupled to the storage device. The logic can be or can include a processor or controller component such as, for example, a processor or controller that executes code stored in the storage device.

The computing architecture 500 can include various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth.

As shown in FIG. 5, the computing architecture 500 can comprise a computer 502 having a processing unit 504, a system memory 506 and a system bus 508. The processing unit 504 can be any of various commercially available processors or can be a specially designed processor.

The system bus 508 provides an interface for system components including, but not limited to, an interface between the system memory 506 and the processing unit 504. The system bus 508 can be any of several types of bus structure that may further interconnect to a memory bus (with or without a memory controller), a peripheral bus, and a local bus using any of a variety of commercially available bus architectures.

The system memory 506 can include any type of computer-readable storage media including any type of volatile and non-volatile memory. The computer 502 can include any type of computer-readable storage media including an internal (or external) hard disk drive (HDD) 514. In various embodiments, the computer 502 can include any other type of disk drive such as, for example, a magnetic floppy disk and/or an optical disk drive. The HDD 514 can be connected to the system bus 508 by an HDD interface 524.

In various embodiments, any number of program modules can be stored in the drives and memory units 506 and/or 514 such as, for example, an operating system 530, one or more application programs 532, other program modules 534, and program data 536.

A user can enter commands and information into the computer 502 through one or more wired/wireless input devices such as for example, a keyboard 538 and a pointing device, such as a mouse 540. These and other input devices can be connected to the processing unit 504 through an input device interface 542 that is coupled to the system bus 508. A monitor 544 or other type of display device can also be connected to the system bus 508 via an interface, such as a video adaptor 546. The monitor 544 may be internal or external to the computer 502.

The computer 502 may operate in a networked environment using logical connections via wired and/or wireless communications to one or more remote computers, such as a remote computer 548. The remote computer 548 can be a workstation, a server computer, a router, a personal computer, portable computer, microprocessor-based entertainment appliance, a smartphone, a tablet, a peer device or other common network node, and typically includes many or all of the elements described relative to the computer 502. The logical connections depicted include wired and/or wireless connectivity to networks 552 such as, for example, a local area network (LAN) and/or larger networks, for example, a wide area network (WAN). Networks 552 can provide connectivity to a global communications network such as, for example, the Internet. A network adapter 556 can facilitate wired and/or wireless communications to the networks 552. The computer 502 is operable to communicate over any known wired or wireless communication technology, standard, or protocol according to any known computer networking technology, standard, or protocol.

Figure 6:
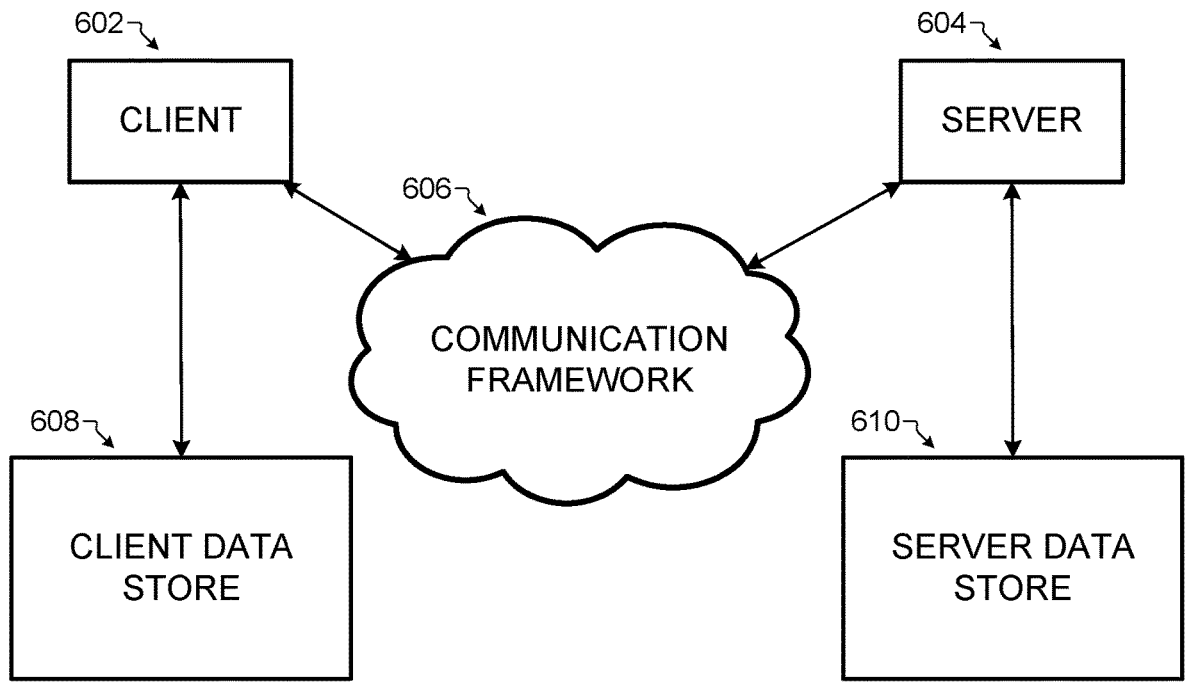
FIG. 6 illustrates a communication architecture.

FIG. 6 illustrates a block diagram of a communication architecture 600. The communication architecture 600 can implement various embodiments described herein. As shown in FIG. 6, the communication architecture 600 comprises one or more clients 602 and servers 604. One of the clients 602 and/or one of the servers 604 can represent any constituent component of the operating environment 100 depicted in FIG. 1.

The client 602 and the server 604 can be operatively connected to a client data store 608 and a server data store 610, respectively, that can be employed to store information local to the respective client 602 and server 604. In various embodiments, the client 602 and/or the server 604 can implement one or more of logic flows or operations described herein.

The client 602 and the server 604 can communicate data or other information between each other using a communication framework 606. The communications framework 606 can implement any known communications technique or protocol. The communications framework 606 can be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators), or any combination thereof. The communications framework 606 can operate over any communication media according to any networking technology including any wired or wireless communications standard or protocol, or any combination thereof.

The following set of first examples pertain to further embodiments.

Example 1 is a computing device comprising a storage device and logic, at least a portion of the logic implemented in circuitry coupled to the storage device, the logic to receive user identification data from a remote computing device, determine an identity of a user based on the user identification data, determine a password for the user stored in the storage device, determine a modified keyboard configuration associated with the user stored in the storage device, transmit a request to the remote computing device for the password for the user based on the modified keyboard configuration, receive a modified password from the remote computing device, determine a converted password based on the modified password and the modified keyboard configuration, compare the converted password to the password for the user, and authorize the user when the converted password matches the password for the user.

Example 2 is an extension of Example 1 or any other example disclosed herein, the request to indicate an identification of the modified keyboard configuration.

Example 3 is an extension of Example 1 or any other example disclosed herein, the logic to determine the remote computing device is a public remote computing device.

Example 4 is an extension of Example 3 or any other example disclosed herein, the logic to determine the remote computing device is a public remote computing device by comparing a received Internet Protocol (IP) address to an IP associated with the user stored in the storage device.

Example 5 is an extension of Example 1 or any other example disclosed herein, the modified keyboard configuration comprising a reassignment of keyboard keys for a standard keyboard configuration.

Example 6 is an extension of Example 5 or any other example disclosed herein, the reassignment of keyboard keys comprising a one-to-one reassignment of all keyboard keys for the standard keyboard configuration.

Example 7 is an extension of Example 5 or any other example disclosed herein, the reassignment of keyboard keys comprising a one-to-one reassignment of a subset of all keyboard keys for the standard keyboard configuration.

Example 8 is a method performing any of the steps or functions (e.g., performed by the logic of the computing device) recited in any of the Examples 1-7.

Example 9 is at least one non-transitory computer-readable medium comprising a set of instructions that, in response to being executed on a computing device, cause the computing device to implement any of the steps of functions (e.g., performed by the logic of the computing device) recited in any of the Examples 1-7.

Various embodiments described herein may comprise one or more elements. An element may comprise any structure arranged to perform certain operations. Each element may be implemented as hardware, software, or any combination thereof. Any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

In various instances, for simplicity, well-known operations, components, and circuits have not been described in detail so as not to obscure the embodiments. It can be appreciated that the specific structural and functional details disclosed herein may be representative and do not necessarily limit the scope of the embodiments.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

The invention claimed is:

1. A method, comprising:
   determining an identity of a user based on identification data received from a device;
   determining a password for the user;
   determining a received Internet Protocol (IP) address of the device does not match an IP address associated with the user;
   determining a modified keyboard configuration associated with the user;
   receiving a modified password from the device, the modified password based on the modified keyboard configuration;
   determining a converted password based on the modified password and the modified keyboard configuration; and
   authorizing the user when the converted password matches the password for the user.

2. The method of claim 1, further comprising determining that the device is a public computing device based on the IP address of the device not matching the IP address associated with the user.

3. The method of claim 1, further comprising:
   transmitting a request to the device for the password for the user based on the modified keyboard configuration.

4. The method of claim 1, further comprising:
transmitting an indication of the modified keyboard configuration to the device.

5. The method of claim 1, the modified keyboard configuration comprising a reassignment of keyboard keys for a first keyboard configuration.

6. The method of claim 5, the reassignment of keyboard keys comprising a one-to-one reassignment of all keyboard keys for the first keyboard configuration.

7. The method of claim 5, the reassignment of keyboard keys comprising a one-to-one reassignment of a subset of all keyboard keys for the first keyboard configuration.

8. A non-transitory computer-readable storage medium storing instructions that when executed by a processor cause the processor to:
determine an identity of a user based on identification data received from a device;
determine a password for the user;
determine a received Internet Protocol (IP) address of the device does not match an IP address associated with the user;
determine a modified keyboard configuration associated with the user;
receive a modified password from the device, the modified password based on the modified keyboard configuration;
determine a converted password based on the modified password and the modified keyboard configuration; and
authorize the user when the converted password matches the password for the user.

9. The non-transitory computer-readable storage medium of claim 8, storing instructions that when executed by the processor cause the processor to:
determine that the device is a public computing device based on the IP address of the device not matching the IP address associated with the user.

10. The non-transitory computer-readable storage medium of claim 8, storing instructions that when executed by the processor cause the processor to:
transmit a request to the device for the password for the user based on the modified keyboard configuration.

11. The non-transitory computer-readable storage medium of claim 8, storing instructions that when executed by the processor cause the processor to:
transmit an indication of the modified keyboard configuration to the device.

12. The non-transitory computer-readable storage medium of claim 8, the modified keyboard configuration comprising a reassignment of keyboard keys for a first keyboard configuration.

13. The non-transitory computer-readable storage medium of claim 12, the reassignment of keyboard keys comprising a one-to-one reassignment of all keyboard keys for the first keyboard configuration.

14. The non-transitory computer-readable storage medium of claim 12, the reassignment of keyboard keys comprising a one-to-one reassignment of a subset of all keyboard keys for the first keyboard configuration.

15. A system, comprising:
a processor; and
a memory storing instructions which when executed by the processor cause the processor to:
determine an identity of a user based on identification data received from a device;
determine a password for the user;
determine a received Internet Protocol (IP) address of the device does not match an IP address associated with the user;
determine a modified keyboard configuration associated with the user;
receive a modified password from the device, the modified password based on the modified keyboard configuration;
determine a converted password based on the modified password and the modified keyboard configuration; and
authorize the user when the converted password matches the password for the user.

16. The system of claim 15, the memory storing instructions which when executed by the processor cause the processor to:
determine that the device is a public computing device based on the IP address of the device not matching the IP address associated with the user.

17. The system of claim 15, the memory storing instructions which when executed by the processor cause the processor to:
transmit a request to the device for the password for the user based on the modified keyboard configuration.

18. The system of claim 15, the memory storing instructions which when executed by the processor cause the processor to:
transmit an indication of the modified keyboard configuration to the device.

19. The system of claim 15, the modified keyboard configuration comprising a reassignment of keyboard keys for a first keyboard configuration.

20. The system of claim 19, the reassignment of keyboard keys comprising a one-to-one reassignment of all keyboard keys for the first keyboard configuration.

* * * * *